US009104766B2

(12) United States Patent
Chan et al.

(10) Patent No.: US 9,104,766 B2
(45) Date of Patent: Aug. 11, 2015

(54) IMPLICIT OR EXPLICIT SUBSCRIPTIONS AND AUTOMATIC USER PREFERENCE PROFILING IN COLLABORATION SYSTEMS

(75) Inventors: Eric S. Chan, Fremont, CA (US); Vimal Chopra, Plano, TX (US); Terry M. Olkin, Niwot, CO (US); Dieter Gawlick, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 13/227,623

(22) Filed: Sep. 8, 2011

(65) Prior Publication Data

US 2013/0066865 A1    Mar. 14, 2013

(51) Int. Cl.
*G06F 17/30* (2006.01)

(52) U.S. Cl.
CPC ................................ *G06F 17/30867* (2013.01)

(58) Field of Classification Search
CPC ..................... G06F 17/30029; G06F 17/30867
USPC .................................................. 707/705–787
See application file for complete search history.

(56) References Cited

U.S. PATENT DOCUMENTS

| 6,640,229 | B1 * | 10/2003 | Gilmour et al. ................ 707/784 |
| 7,685,199 | B2 * | 3/2010 | Chandrasekar et al. ...... 707/748 |
| 7,797,289 | B2 | 9/2010 | Chan et al. |
| 2007/0077920 | A1 * | 4/2007 | Weeks et al. ............... 455/414.1 |
| 2011/0135075 | A1 * | 6/2011 | Hubner et al. ........... 379/142.04 |

OTHER PUBLICATIONS

Bourigault et al.,"Term Extraction + Term Clustering: An Integrated Platform for Computer-Aided Terminology," Proceedings of EACL'99, pp. 15-22.
Wacholder et al., "Toward a Task-based Gold Standard for Evaluation of NP Chunks and Technical Terms," Proceedings of HLT-NAACL, 2003, pp. 1-8.
Atro Voutilainen, "NPtool, a Detector of English Noun Phrases," in Proceedings of the Workshop on Very Large Corpora. 1993, pp. 48-57.
Lenat, et al., "CYC, WordNet, and EDR: Critiques and Responses," Communications of the ACM, Nov. 1995, pp. 45-48.

* cited by examiner

*Primary Examiner* — Tony Mahmoudi
*Assistant Examiner* — Tuan-Khanh Phan
(74) *Attorney, Agent, or Firm* — Kraguljac Law Group, LLC

(57) ABSTRACT

Systems, methods, and other embodiments associated with event processing are described. In one embodiment, a method includes detecting an event. The example method may also include analyzing the event to extract information about the user and processing a subsequent event in accordance with the extracted information about the user.

20 Claims, 6 Drawing Sheets

IMPLICIT OR EXPLICIT SUBSCRIPTIONS AND AUTOMATIC USER PREFERENCE PROFILING IN COLLABORATION SYSTEMS

BACKGROUND

Many enterprises use collaboration systems, such as content management systems, to manage and store large amounts of data. The collaboration systems typically use different types of policy, workflow, and/or preference frameworks to aid the process of administering and accessing data in the content management system. Policies are generally used to centralize business rules, while workflow typically controls a chain of actions, such as a sequence of approvals, that are to be performed when certain triggering events occur. The policies and workflow combine to provide users of the content management system with access to the data they need in a timely manner without overloading the user with too much information.

Content management systems often provide ways for users to customize the behavior of the content management system with respect to their interaction with the system. Preferences, profiles, and subscriptions are examples of customization features provided by some content management systems. Preferences maintain settings that specify choices, courses of actions, or customization associated with a user or a group of users. Profiles correspond to instances of preferences related to a present user context. For example, a user may have a work profile in which she desires to receive notification of any meetings on certain projects when they are scheduled. The user may have a vacation profile in which she receives no notifications of meetings and is notified only of e mail messages marked urgent. Subscriptions allow a user to specify conditions and actions to be taken when certain events occur. For example, a user may subscribe to any documents that are produced in a given project's workspace. The user is then notified when a new document is saved to the system or an existing document is revised.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
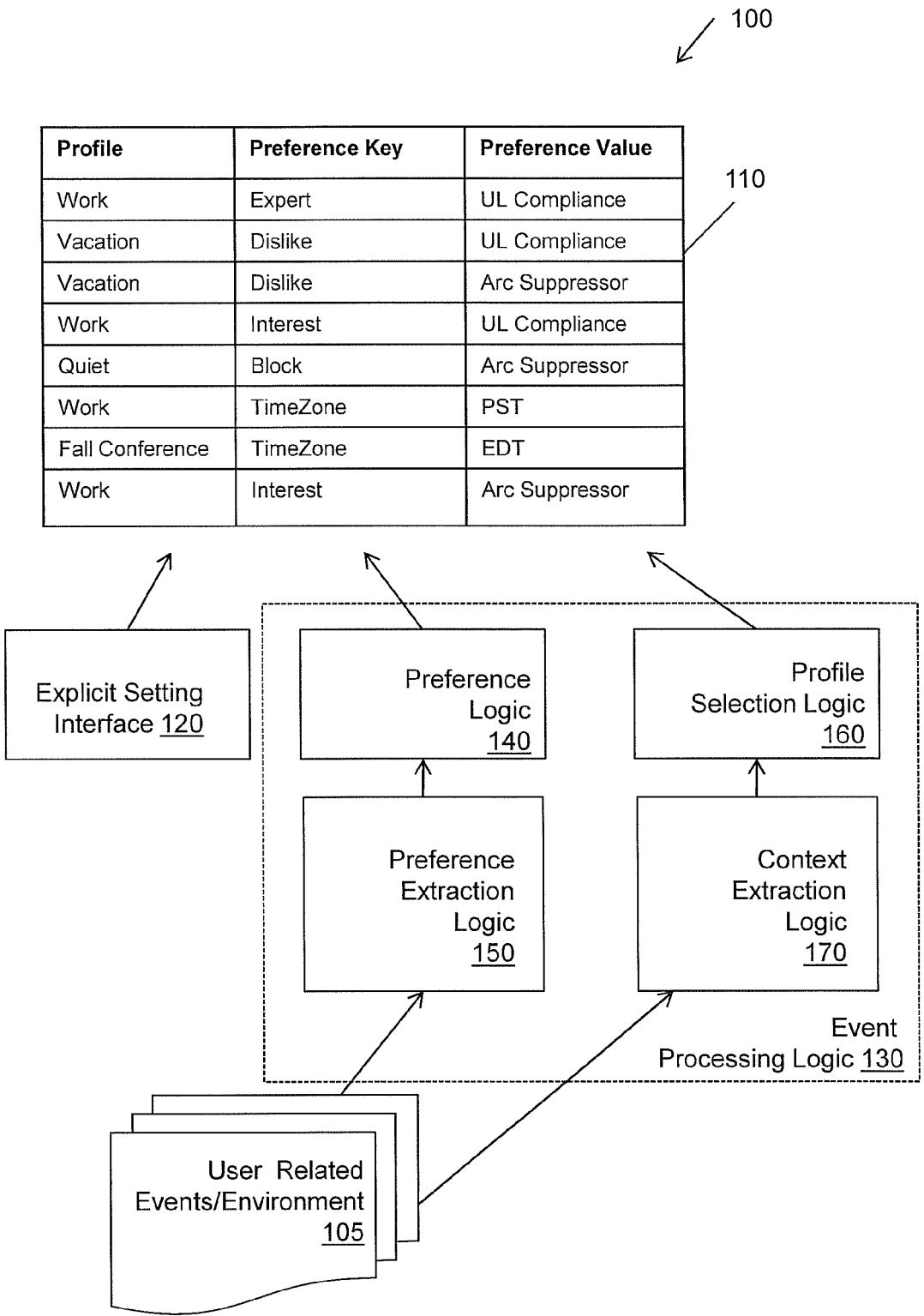
FIG. 1 illustrates one embodiment of a system associated with event processing.

One goal of a collaborative content management system is to provide users with access to documents, messages, and data they need to collaborate with other users while enforcing business rules such as access policies and document handling protocols. To provide a good end-user experience, the user can customize many aspects of the system's behavior to suit their own tastes. However, it can become burdensome for a user to manipulate all of the settings necessary to fully specify their desired system behaviors. Further, the user may not be aware of the breadth of resources available on the system and thus may not be able to take advantage of them. For example, because a user must specify a certain type of document when creating a subscription, a user cannot subscribe to documents that he does not know about. In addition, the system may not be aware of users with an expertise in a certain area, unless the user has been explicitly designated as such. This may hamper workflow when a pre-designated expert is not available to participate in a process that requires an expert. The term "user" as used herein can refer to an individual user, a group of individual users, or an organization of individual users.

Systems and methods are described herein that provide processing of events in an event processing system, for example a content management system. Information about a user's tastes, interests, context, etc. . . . , is extracted from artifacts (content management entities such as documents, e-mails, calendar entries, and so on) associated with the user. This information is used to customize the system's processing of future events in accordance with the information that has been obtained, without specific instruction by the user to do so. In this manner, the content management system can tailor the processing of events to match the user's needs without troubling the user to input customization instructions to the system. The term "user" as used herein can refer to an individual user, a group of individual users, or an organization of individual users.

The systems and methods described herein incorporate new solutions that may apply natural language processing (NLP) and expertise finder tools to extract a user's expertise and interests (in the form of noun phrases or topics) from the user's contributions to a content management or messaging system. A detailed description of an expertise finder tool may be found in U.S. Pat. No. 6,640,229, which is incorporated herein by reference in its entirety. The noun phrases or topics that are extracted by the tools are included among the user preferences. The user may classify the noun phrases or topics as being an area of expertise, an interest, a like, a dislike, a recommendation, and so on. In addition, the preferences may be aggregated under different profiles. The user preference profiles are applied to create explicit or implicit subscriptions for events or conditions in the environment.

The type of information extracted by NLP includes terminology noun phrases (NP), named entities (NE), co-references of named entities, attributes of named entities, relationships among named entities, events and participating named entities, semantic characterization of named entities by taxonomy or ontology, types of relationships among named entities, to name some of the common extraction tasks. Among these information extraction (IE) tasks, the terminology noun phrase extraction task can perform satisfactorily for an unrestrictive domain of corpus while other tasks require a critical mass of domain specific terms, ontology, and rule calibration to perform satisfactorily for a specific domain of corpus.

The IE tasks are listed above in general order of increasing complexity with each succeeding task depending on the capability of the preceding task. For example, the named entity extraction task typically depends on the capability of the noun phrase extraction task and the co-reference task typically depends of the noun phrase and named entity recognition tasks in order to recognize that a noun phrase such as "the 44$^{th}$ President of the United States" is a co-reference of the named entity "Barack Obama" in the text.

The attributes of named entities are extracted by a template element (TE) production task, which can fill in the "the 44$^{th}$ President of the Unites States" as a title of "Barack Obama." The relationships among named entities are extracted by a template relation (TR) production task.

Events and participating named entities can be extracted by a scenario template (ST) production task. For example, the ST may process the sentence "in 2011, John Smith competed on the quiz show Trivia Today, winning the first prize by outperforming his competitors Joe Ford and Tom Jones." From this sentence the ST task can detect a quiz show Trivia Today event in 2011 and characterize the three participants of the event: John Smith, Joe Ford, and Tom Jones. The named entity classification and relation type recognition task can characterize that the quiz show Trivia Today event is a "television show."

The performance of an IE task is measured by precision, recall, and F-measure. The precision of an extraction task measures the percentage of extracted items that are relevant for extraction by the task, whereas the recall measures the percentage of relevant items among all items extracted by the task. For example, an IE task is extracting terms that are relevant to a given topic out of a pool of terms, 50 of which are relevant to the topic. If the task identifies 40 terms as relevant, 30 of which are actually relevant, then the precision of the task is 30/40, or the number of actually relevant terms divided by the total number of terms identified by the task. The recall of the task is 30/50, or the number of terms identified by the task that are actually relevant divided by the total number of relevant terms in the pool of terms.

Put another way, a higher precision typically implies that the task is more selective and the identified terms are more likely to be relevant. A high precision task entails a greater risk of not identifying all relevant terms. A higher recall typically implies that the task is less selective, and the identified terms include more non-relevant terms. A task with a high recall entails a greater risk of identifying non-relevant terms. The F-measure of an extraction task is a weighted harmonic mean of the precision and recall measures of the task. It provides a single measure that trades off the precision and recall performance of a task.

In the processing of subscriptions, precision and recall can be traded off by calibration of the information extraction tasks. To this end, some of the terminology noun phrase extraction tools perform term normalization. For example, an extraction task that normalizes the terms into compound nouns can recognize that the terms such as "nuclear reactor fuel" and "nuclear reactor spent fuel" are related by indicating the latter is more specific than the former. Normalization can be achieved by a shallow grammar (i.e., a task that looks to surrounding words to analyze a given wordy that detects the adjective modifier, in this case "spent," between two nouns in the phrase. The recall measure can increase by treating "nuclear reactor spent fuel" as relevant to subscriptions for "nuclear reactor fuel" without affecting the precision. However, if "nuclear reactor fuel" is treated as relevant to a subscription for "nuclear reactor spent fuel," the recall measure increases at the expense of the precision measure. Depending on the weights of precision and recall, the F-measure can indicate overall improvement or deterioration of conflating two terms for subscription filters.

A noun phrase is a grammatical unit that is centered around a head noun with expansion words comprised of adjacent nouns, prepositions, and postpositions (e.g., of, on, in, under, etc. . . . ) and function words (e.g., a, the, and, not, may, will, etc. . . . ). Noun phrases are commonly used as index terms for large bodies of texts. A subset of noun phrases extracted from a corpus can comprise the core terminology of the domain of the corpus. Longer noun phrases, measured by the number of words and composition complexity (number of prepositions) are considered to represent more refined concepts of the corpus. Many terminology noun phrase extraction tools focused on detecting maximal length noun phrases. The noun phrase extraction task depends on preprocessors that tokenize the natural language texts into words, that split the sentences, and that annotate the words with tags identifying the word's part-of-speech. Tags include noun, verb, adjective, adverb, preposition (e.g., of, in, etc. . . . ), conjunction (e.g., and, but, or, etc. . . . ) article (e.g., a, an, etc. . . . ), modal (e.g., may, will, etc. . . . ).

The part-of-speech (POS) tagging task employs a list of lexicons with a morphological analysis of words or a probabilistic language model of word sentences to tag the words. Morphological analysis involves analysis of affixes to a lemma (a base word) to identify the part-of-speech of a word. For example, a word with the suffix "ness" is determined to be a noun derived from an adjective, such as correctness. Some POS tagging tasks can add the morphological distinctions such as inflection, derivation, and syntactic functions in the tags. In addition to morphological analysis, some POS tagging tasks employ context-sensitive syntactic rules to resolve conflicts. For example, the English word "fly" can be a verb or a noun. In the sentence "A fruit fly landed on an apple," a POS tagging task can recognize that "fly" is part of the compound noun "fruit fly" in the context of (subject) "fruit fly," (verb) "landed," (preposition) "on," (object) "an apple."

A POS tagging task may also employ morphosyntactic rules to resolve the POS of the word "fly" in the sentence "It is interesting to see a fruit fly through a microscope." By morphological analysis of the word "fly" with the inflection "flies" and a syntactic rule which expects the inflection "flies" (barring a typographical error) for agreement with the singular cardinality of "a fruit," a POS task can score "fruit fly" as a compound noun. Some NLP tools employ expanded lists of lexicons to resolve syntactic ambiguities. The noun "fruit fly," which is part of the English language vocabulary, can inform a probabilistic language model to assign a zero probability of classifying a verb "fly" following "fruit." Humans can employ extra-syntactic or semantic knowledge to recognize that a fruit cannot fly or things cannot fly through a microscope lens. NLP tools may employ external knowledge bases such as Wordnet, Cyc, and EDR to aid in these analyses.

Once the words in a sentence are tagged by part-of-speech, the maximal length noun phrases can be extracted by shallow grammars, such as by the use of regular expressions. Given that nouns are denoted by N, adjectives by J, and determinants by D, then the regular expression D?J*N+ recognizes any noun phrase that has an optional determinant followed by zero or more adjectives followed by one or more nouns. The noun phrase "the traveling salesman" matches this regular expression. The noun phrase extraction tasks typically extract the longest noun phrase that matches a regular expression.

Terminology noun phrases are subsets of noun phrases. One or more noun phrases may be extracted by splitting the maximal length noun (MLN) phrases at conjunction/preposition word boundaries and removing pronouns, articles, and definitives. Shorter noun phrases that occur relatively frequently in the corpus are potential terminology noun phrases. For example, the phrase "the Association of Computing Machinery" can be split from an MLN phrase "Communications of the Association of Computing Machinery" by removing one of the prepositions "of." "The Association of Computing Machinery," combined with the acronym ACM, is a common terminology noun phrase or topic for computing literature.

For automatic preference profiling, the terminology noun phrases or terms extracted by analysis of natural language text in the messages, documents, forums, blogs, etc., are automatically assembled into user or group preference profiles. Each term in the preference profiles can be assigned a confidence level that is derived from several feature measures, such as the term's length (measured in number of words), the number of lexemes from terminology lexicon, the complexity of composition (number of prepositions) in the term, the frequency of occurrence of the term within the user or group contributed content, the density of the term within the user or group contributed content, the frequency of the term in the corpus of all contributions from all users, the zone of occurrence of the term (e.g., title, subject field, abstract, conclusions, body, etc. of the artifact) and a measure of inverse author frequency.

The inverse author frequency, analogous to inverse document frequency (idf) for document ranking (tf-idf) in information retrieval, is given by the logarithm of the ratio of the number of all authors and the number of authors who write about the term. The inverse author frequency measures the selectivity of the authors by the term; its value is higher for the terms that belong to the preference profiles of a smaller percentage of authors (i.e., relatively few authors have expertise in the topic).

There are several approaches to scoring the confidence level from these separate quantitative feature measures. In one example approach, the confidence level is grouped into a small number of qualitative grades (e.g., 0-5, with 5 being the highest and 0 being the lowest) and each of the quantitative feature measures is classified by the qualitative grades. The confidence level grade is then derived as a grade point average of the grades for feature measures. The confidence level grade can also be derived by decision trees from the feature grades. This approach of classifying the grades for each feature measure and deriving the grade for confidence level can employ machine learning or manual calibration. The grading rules can accommodate personalization for an organization, group, or user experience.

Since the confidence level of a term in a preference profile changes with each new occurrence of the term in the overall corpus and each new reference of the term by any author, the system may continuously update the confidence levels across all profiles. A user or group may categorize the terms as expertise, interest, like, dislike, recommendation, etc. The same term can be classified differently in different preference profiles for a user or group. The assembled terms and corresponding confidence levels in a given category (e.g., interest category) in a preference profile are part of the conditions for subscriptions and filters for selecting relevant artifacts among streams of new contents. If the confidence level of a term in a preference profile is high enough, for example, graded 4 or higher, a new document that contains a single matching term may satisfy the filter conditions. On the other hand, several more matching terms with low confidence levels, for example, 1 or lower, in a preference profile may be required for a new document to satisfy the subscription filter condition.

Here is one scenario of how the user preference profiles can be used for explicit or implicit subscriptions. A given user has two profiles, "At Work" profile and "On Vacation" profile. A noun phrase such as "Nuclear Reactor Spent Fuel" that the user has frequently written about or searched for can be automatically profiled by the system as an element of the user preferences. The user may classify the related phrases "Radiation Leak", "Radiation Risk", "Nuclear Power Plant", "Nuclear Reactor Spent Fuel," "Nuclear Crisis Management" as her interests or expertise in one or more of her profiles. The system can match the noun phrases from the news feeds, for example news from Fukushima Daiichi nuclear power plant crisis, with the users' preference profiles and generate alerts for the user. The user may classify the above topics as her interests and expertise in her "Work" profile and as expertise in her "Vacation" profile.

This configuration can be interpreted by the system to mean that while at work, the user is interested in receiving notifications about these topics in the news. However, if she is on vacation, she is willing to receive notifications about these events in the news if the system determines that it is urgent enough for her attention. This may be the case if the system cannot find another user who has expertise in the same topic, i.e. listed as his or her expertise in the active preference profile. By classifying the topics as her interests in the "Work" profile, the user is subscribing for notification of these events. Classifying the topics as expertise on the other hand, the user is deferring to the system to push the notifications to her only as task assignments.

Preferences can be associated with enterprises as well. An enterprise can have preference profiles for detecting events. For example, an enterprise may have a "QUIET Period" profile which becomes active around the end of the quarter and before the release of the quarterly earnings report. This profile may change the conditions for detecting the events based on the context or condition of the environment (within two weeks of the end of the quarter is a condition of the calendar).

In another of example, the Department of Homeland Security may have profiles corresponding to the color-coded alert levels. These profiles may change the conditions for detecting events for notifications or dispatches. Subscribers of notifications can be individual users as well as groups of users. Groups can be represented by their shared spaces and the notifications may be posted on the wallpaper, forum, and activities streams of a team space. The space can be associated with preferences and profiles of preferences. The system can automatically build the team space preferences by detecting events in the team space and extracting the topics associated with events.

With reference to FIG. 1, one embodiment of system 100 that provides event processing is illustrated. The system stores "artifacts" and processes "events." An artifact can be defined as a type of entity that results from some type of communication or collaboration and that has been assigned a unique identifier. A simple event can be defined as an occurrence of some action in the system or an operation on an artifact that is stored in the system. Example simple events would include the uploading of a document, the sending of an e-mail, the scheduling of a meeting, and the creation of slides for a presentation. Complex events can be defined as conditions over temporal state sequences. Example complex events include the example complex event patterns specified in temporal logical expressions in this specification.

FIG. 1 illustrates a subset of all events, user related events 105, that are performed by a given user. The system 100 is also aware of the user's environment, which may include such things as the time, date, geographic location, and so on. The system 100 is typically divided up into workspaces that are each associated with a specific project or functional area. Users are granted access to those workspaces within their area of responsibility. Thus, users in a workspace may wish to be notified when an event occurs in a workspace to which they belong. In some embodiments, complex expressions are generated that can combine the conditions of enterprise preferences, user preferences, group preferences, classifications of each preference value (interest, expertise, like, dislike, recommendations, etc.), contents, topics to detect events.

The system 100 stores user preferences in a preference table 110 that can be stored in a database. In typical content management systems, a system administrator or user explicitly populates the preference table using an explicit setting interface. 120. User preferences are recorded using preference key, value pairs. Some preference values can change depending on user's present context. To address this difference in preferences depending on user context, the preferences are organized according to profiles, with a profile corresponding to a given instance of user preference values. For the user shown in FIG. 1, the user preferences indicate that when the user is in the "Work" profile, she has an interest in UL compliance, is interested in a particular product workspace "Arc Suppressor", and is located in the Pacific time zone. When the user is in the "Vacation" profile, she "dislikes" (is not interested in) UL Compliance and the Arc Suppressor product. The user's preference table 110 also indicates that when she is at the Fall Conference she is located in the Eastern time zone. The user has been designated as an "expert" in UL compliance, either by herself or the system, as will be described in more detail below.

The system 100 includes policies on how the information in the preference table is applied to system behavior. For example, the system may have a policy that specifies that meetings are to be scheduled between 9:00 AM and 4:00 PM in the user's time zone. The system may have a policy specifying that when a user is "interested" in a workspace any modification to an entity in the workspace results in notification for the user, while when a user "dislikes" the workspace, no notifications are sent to the user. Sometimes policies can override user preferences. For example, if the user is designated an expert in a certain area (UL compliance), the policy may specify that the user receives certain urgent notifications even if the user has communicated a desire (e.g., is in vacation profile) not to be notified. Thus, being designated as an expert may result in an "implicit subscription" to events related to a user's area of expertise.

In one embodiment, the system 100 parameterizes policies by binding variables to policy constants at runtime (at event processing time). This allows the policy author to bind the variables of the policies to the constants from appropriate preference values. Some examples of preferences that can be used by policies are the quota for storage utilization, the quota for notification messages, the retention period for record management, and the preferred language and locale of a workspace.

Policies influence the creation and usage of user preferences. For example, as part of the user's notification preferences, the user can specify a list of delivery channels in the order of preference. If the user's first preferred delivery channel is push mail, at runtime the system retrieves the user's preference from the stored preference information and provides a notification of an event via push mail. However, if the user's quota of push mail has been exceeded, the policy may specify that the system retrieve the user's second preferred delivery channel and provide a notification via that channel.

Through policy observers (not shown), the system 100 captures the one-to-many dependency between entities so that when a specified trigger condition is activated in the source entity, all the dependents are notified automatically. The dependents are policy instances. The number or types of policies do not need to be coded into the trigger points of the source entity. Any number of policies can be configured to observe the trigger points in any entity to inject the business rules. The trigger point in the source entity can invoke the dependent policies directly. Alternatively, the source entity can raise the Event and let an intermediary feed the events to the dependent policies. The latter approach supports loose coupling between the source entity and dependent policies.

In general, policies can affect the lifecycles of the workspaces, folders, documents, discussion forums, conferences, messages, calendars, tasks, and journals that the user can create, share, coordinate, and communicate with each other. The policies influence how the users detect each other's presence or receive messages via pervasive devices.

There are specialized subclasses of policy, such as a Record Management Policy, a Message Control Policy, a User Provisioning Policy, a Notification Policy, an Email Preference Policy, a Conference Preference Policy, a Time Management Preference Policy, a Notification Preference Policy, to name a few. Each of these specialized policies can be formulated in terms of workflows, forward-chaining systems (rete, rule-based), backward chaining systems (prolog or datalog), which are a few of the commonly used inference strategies. Strategy classifies the policy statements by the grammar of the language and execution models. For example, an instance of the Rule Based Strategy contains the rule sets, fact types, condition templates, and action templates defining a rule-based application. A Workflow Strategy is a different schema for specifying the temporal sequences of processes. The workflow schema is different from the schema of a rule-based production system. A complex policy may employ multiple rule-based strategies and workflow strategies, with rule actions starting workflows and workflow actions evaluating rule-based strategies.

The declarative languages of a rule-based strategy offer the ability to formulate expressions. There are two levels of knowledge bases in a rule-based strategy; one level is composed of long term memory components called rule bases and another level is composed of short term memory components called fact bases. For rule based strategies, the users can define the rules in IF (condition) THEN {action}" constructs much like in procedural languages. However, the condition part of the rule specifies the pattern matching expressions among facts that are processed by specialized algorithms, two of which, the rete networks and the database expression filters, are commonly in use.

The rule sets for the rule-based strategies comprise the long-term memory components of the system, whereas the rule-like instructions such as a Message Control Instruction and a Record Management Instruction can be asserted into the fact bases of the strategy. The following rule definition (in Oracle rule language) is one of the rules in the rule bases of the Notification Policy, and as such, it is part of the long-term memory component of the rule-based strategy. The condition part of the rule defines the pattern matching expressions between the user's notification subscription facts and the event facts.

```
rule NotificationRule {
    if (fact NotificationSubscription sub &&
        fact Event event &&
        EvalCondition(sub.condition, event)) {
            DoAction(sub.action, event);
    }
}
```

In the above rule definition, the if-clause defines the rule condition. This rule construct allows evaluation of the rule conditions and rule actions contained in the NotificationSubscription object. The rule engine's built-in function EvalCondition will interpret the RuleCondition object of the NotificationSubscription. When the subscription matches the event properties, then the RuleAction object of the NotificationSubscription will be invoked via another rule engine built-in function DoAction. In both cases, the Event object is passed to the callback classes of the condition and action objects. The above example also shows how the business objects can be used in the definition of the rule base of the strategies.

Such a rule based pattern is necessary in order for the rule engines, which employ the rete networks, to support hundreds of thousands of rule-like instructions specified by the users. The fact base that contains facts like NotificationSubscription is referred to as short term memory component because the facts can be added and retracted dynamically. It does not mean that notification subscriptions are transient objects. For example, when the users disable their subscriptions, the corresponding NotificationSubscription facts should be promptly retracted from the fact base. The notification subscription objects are persistent objects and so they can be asserted into the fact base on demand when the Event arrives. Using a rule expression, the following describes how the NotificationSubscriptions can be retrieved from the persistent storage and fed into the fact base on demand.

```
rule NeedNotificationSubscriptions {
    if (fact Event event) {
        loadNotificationSubscriptions(event.source,
            event.type);
    }
}
```

The built-in function loadNotificationSubscriptions( ) loads all NotificationSubscriptions that have the matching source and type. The system can create or update an observer instance on demand when the user submits a new NotificationSubscription. A similar rule base pattern is also supported by database expression filters. To define the same type of rule base using expression filters, a table is defined that contains a column of expression type for the rule condition and another column for rule action. The filter expressions in the RuleCondition follow the SQL where clause syntax that can refer to the parameters in the attribute set.

```
CREATE TABLE NotificationSubscription (
    Subscriber User,
    RuleCondition VARCHAR2(200),
    RuleAction VARCHAR2(40));
```

After defining the NotificationSubscription table, the following function can be used in the dbms_expfil package to declare that the filter expressions in the RuleCondition will be matched against the attribute sets in the Event objects.

```
begin
    dbms_expfil.assign_attribute_set(attr_set => 'Event',
        expr_tab => NotificationSubscription,
        expr_col => 'RuleCondition');
end;
```

The Event object type is defined as follows:

```
CREATE OR REPLACE TYPE Event AS OBJECT (
    SourceScope Scope,
    Source Entity,
    Type EventType,
    Action Doer Actor
);
```

The following function can be used in the dbms_expfil package to declare Event objects as the attribute sets for the expression filter.

```
begin
    dbms_expfil.create_attribute_set(attr_set => 'Event',
        from_type => 'YES');
end;
```

Pattern matching is performed when the rule actions are selected for the expression filters that match the attributes of the Event as shown below.

```
SELECT User, RuleAction
FROM NotificationSubscription
WHERE EVALUATE (RuleCondition,
    Event.withData(data)) = 1;
```

The user's notification subscriptions are persisted in the NotificationSubscription table. The table can include additional columns, such as the preferred delivery channels and enable or disable states which are part of the NotificationSubscription. Depending on the implementation, the RuleAction column may be omitted if "DoNotify" is the only type of action. However, in general the actions may be individualized.

The system 100 may employ the policy observers' metadata to register policies to be notified of the events from the specified trigger points in the source entity. Triggers are well known conditions that are stimuli for events whereas policies define the conditions and actions of the Event-Condition-Action (ECA) scheme. When the trigger fires, an event is dispatched to the associated policy, which will evaluate the event and activate the resulting actions. Below, {EventType} denotes an unordered set of event types and <Policy> denotes an ordered set of policy objects.

```
PolicyObservers =>
    Description : richtext,
    Source : Entity,
    EventTypes : {EventType},
    Observers : < Policy>,
    Expiration : timestamp
```

Each of the policies can inject various plans of actions, such as audit, record management, workflow, message filtering, notification, etc. The observers will become inactive after the expiration time.

In addition to simple inserts and deletes in a message system, events can be defined broadly as a state change in data, or even as the absence of an occurrence of some expected change in data. In other embodiments, events may be generated synchronously or asynchronously from database select, insert, update, and delete operations. Events may further include various timer events and non-occurrence of expected events (such as timeouts).

In some embodiments, events are generated from the well-known trigger conditions in an entity. This means that each entity would need to define its set of trigger points. In such embodiments, these trigger points may be buried in the code so that appropriate actions can be taken at the appropriate times that could alter the course of an operation on the entity.

In some embodiments, events may be detected by a native language associated with event data, e.g., SQL for relational data. The actions that are performed as a result of the occurrence of the events may be specified in a language associated with a content management system. This approach leverages the full power of the underlying language.

Events may be refined or classified using contextual information from preference profiles, conditions, and natural language information extraction. Some events may be composed of hierarchies of composite and simple events with explicit or implicit causal relations among events. For example, a business process event may be composed of a set of business application events which in turn may be composed of a set of computer network communication events, with causal relations from lower level component events to higher level composite events. Some of these relations may be complex and require complex event processing (CEP) capability.

In addition to the explicit setting interface 120, the embodiment shown in FIG. 1 includes an event processing logic 130 that monitors the user related environment and events (and the artifacts associated with the events) to extract user information that can be used to automatically populate the preference table 110 without explicit user instruction. The event processing logic 130 may include a natural language processor (not shown) that parses artifacts associated with the user related events 105 to extract noun phrases that may correspond to a topic of the artifact. For example, as described above, NLP tools can normalize topics from a set of terms by confidence levels. The event processing logic 130 may also include a named entity recognition (NER) processor that identifies character patterns such as dates and phone numbers.

A preference extraction logic 150 extracts preferences from the user information extracted (e.g., noun phrases describing the topic of the user related artifacts) by the event processing logic 130 from the user related events. For example, if the event processing logic 130 determines that the user has opened a number of documents that all have a certain topic while in a work profile, then the preference extraction logic 150 may infer that the user is interested in the topic. A preference logic 140 will then populate the preference table 110 with a row corresponding to profile "Work", preference key "Interest", and preference value "Topic". Any subsequent processing of events according to a policy for the "Interest" preference key will be performed in light of the user's preference for the topic. The preference extraction logic 150 may parse a user's meeting invitations and determine that the user appears to prefer to meet in the morning. The preference logic 140 populates the preference table with a row corresponding to profile "Work", preference key "Preferred Meeting Time", and preference value "Morning".

The preference extraction logic 150 may have various criteria for determining whether a user is interested in a topic such as a threshold number of events related to a topic. The preference extraction logic 150 may also deduce that a user is an expert based on other, more stringent criteria. In another example, the preference extraction logic may parse a meeting invitation acceptance from the user for a meeting in the mountain time zone. The preference extraction logic may create a new row indicating a profile for the meeting having the time zone mountain time.

The preference extraction logic 150 may attach a confidence level to a topic that is a preference value in the preference table 110 based on the confidence with which the preference extraction logic 150 extracted the topic from the user related events 105. This confidence level may be stored in the preference table 110 for use by a subscription logic (see FIG. 2) that filters events and triggers notifications to users based on preference values in the users' preference tables. A confidence level of 100 percent may be assigned to preference values that were explicitly set by the user or a system administrator.

The event processing logic 130 also may include a context extraction logic 170 that extracts a user's present context from user related events. The context extraction logic 170 provides the extracted context to a profile selection logic 160 that selects an active profile corresponding to the extracted context. For example, the context extraction logic 160 may parse an "out of office" notice for the user that states that the user is on vacation and automatically select the vacation profile.

Policies can be developed to properly deal with preferences, explicit and implicit. For example, if a user has three topics of interest, a policy may state that if the user is in a work profile, a disjunctive combination of the topics will generate a notification, while if the user is in a vacation profile, only a conjunctive combination of the topics will generate a notification. A policy that handles events differently according to whether they occur during business hours or not may look to a user's active profile to deduce a time zone in which the user is present.

Figure 2:
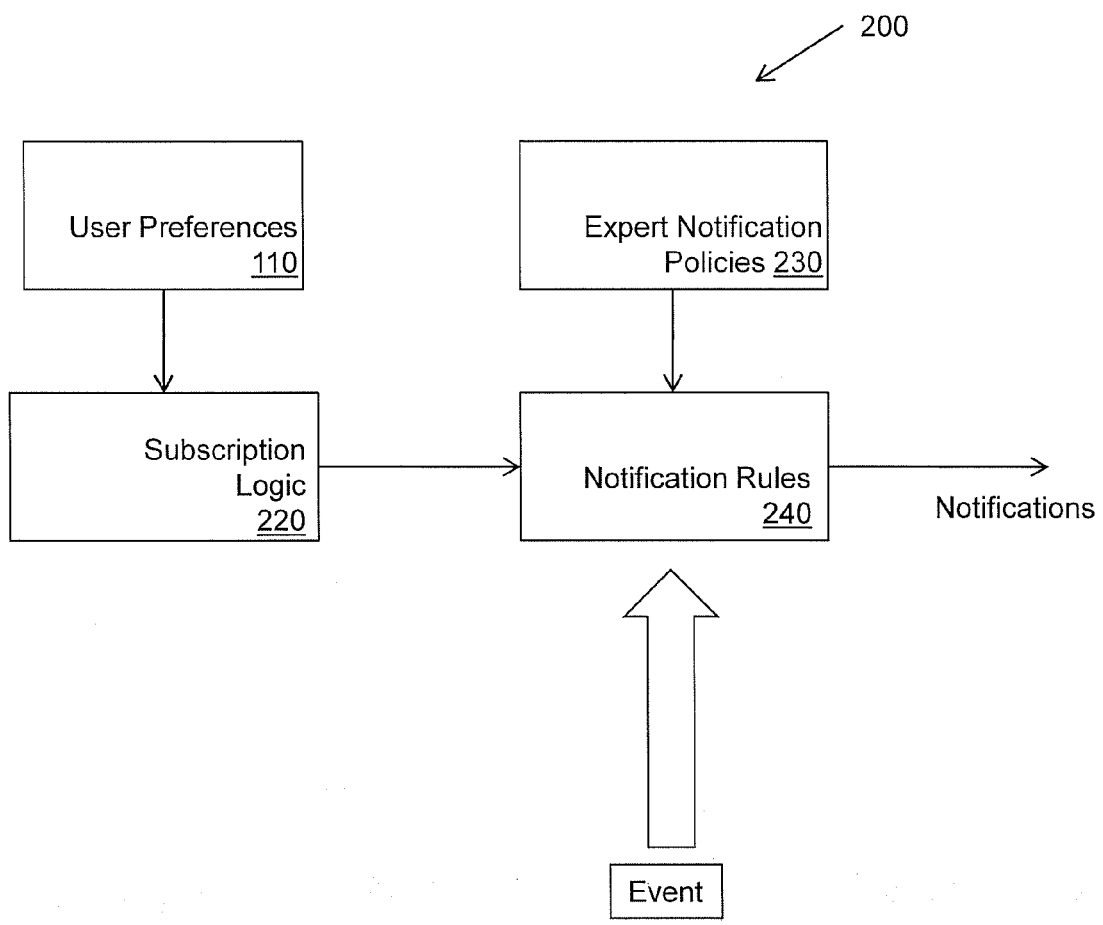
FIG. 2 illustrates another embodiment of a system associated with event processing.

FIG. 2 illustrates one embodiment of a system 200 that provides notifications of events to users. The system 200 includes one or more notification rules 240 that are processed to provide notification to user as discussed above. The notification rules 240 can be created using a subscription logic 220 in which a user or administrator explicitly crafts notification rules to subscribe the user to event notifications.

The subscription logic 220 may also create notification rules without user intervention. For example, when a new topic is added to a user's preferences as an "interest", the subscription logic 220 creates a rule that subscribes the user to notifications of events related to the topic. In some instances, a new rule does not need to be created per se, because there may already be a rule that sends notifications to users having an "interest" in the event. Expert notification policies 230 also contribute notification rules 240 that are based on an enterprise's expert policy. Notification rules associated with expert notification policies may override a user's preference in situations in which the filter conditions are met.

The subscription logic 220 may create additional rules for use in processing notifications for preference values that have been extracted from the user's related artifacts. For example, the subscription logic may ask the user if they want a subscription when a preference value has been extracted for the user. The rules may also specify various notification filter conditions that are based on the confidence associated with an extracted preference value. For example, a notification filter condition may hold that if a term in a preference table was extracted with a high confidence level (e.g., a confidence of greater than 69%), a new document that contains a single matching term results in a notification while a term with a lower confidence level (e.g., less than 70%) requires multiple matching terms to result in a notification.

Figure 3:
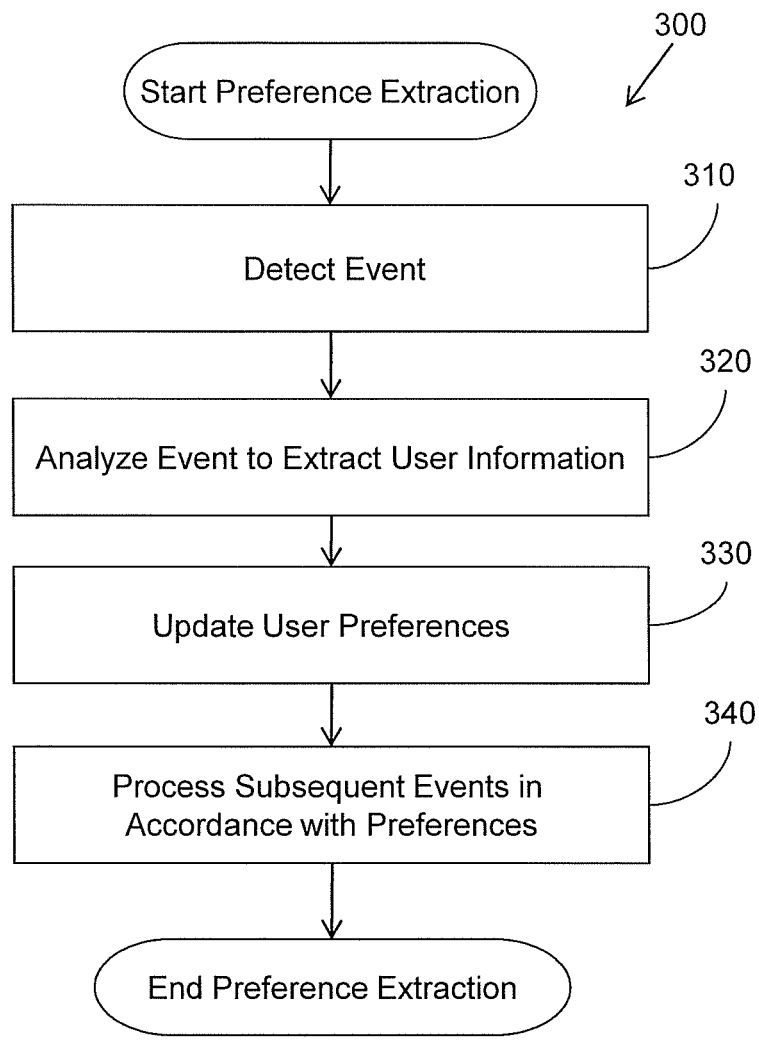
FIG. 3 illustrates one embodiment of a method associated with event processing.

FIG. 3 illustrates one embodiment of a method 300 associated with event processing. At 310 the method includes detecting an event in a content management system, where the event is associated with a user and is not an instruction by the user to specify content management actions to be performed in response to future events. At 320, the event is analyzed to extract information about the user. NLP, NER, or any other suitable technique may be used to extract the information (e.g., topic of an artifact related to the user). At 330, the user's preferences are updated based on the extracted information. At 340, the method includes processing a subsequent event in accordance with the extracted information about the user.

In some embodiments the method 300 includes analyzing an artifact associated with the user (e.g., created or accessed by the user) to determine one or more topics of the artifact. The user's preference table may be updated to indicate that the user has an association with the topic. For example, the association with the topic may be interest in the topic, an expert status with respect to the topic, a dislike for the topic, and so on. The association may be recorded in the preference table 110 (FIG. 1) as a preference key. The user may be subscribed to notifications about events related to the one or more extracted topics. In some embodiments, the method 300 includes determining an active profile for the user and processing notification subscriptions for the user based on the active profile.

Figure 4:
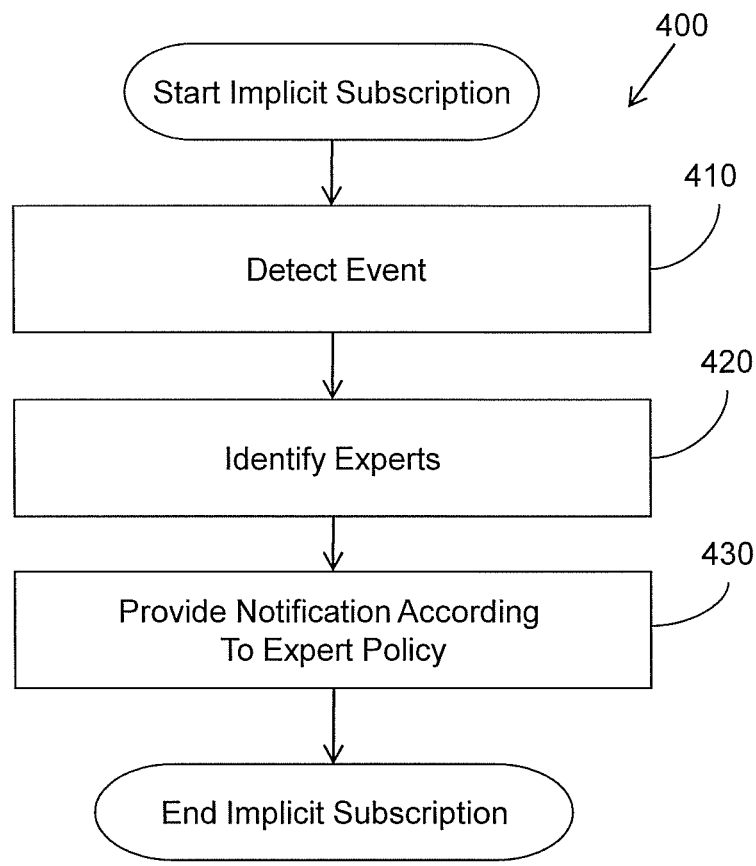
FIG. 4 illustrates an embodiment of a method associated with event processing.

FIG. 4 illustrates one embodiment of a method 400 associated with generating implicit subscriptions to events based on a user's expert status. At 410 the method includes detecting an event that meets notification rules requiring notification to at least one expert. At 420, users that have been designated expert for a topic related to the event are identified. This may be accomplished by analyzing user preference tables (see FIG. 1) to locate a user that has an expert designation. At 430, the method includes notifying the identified expert about the event according to a notification policy. This notification may occur without an explicit request by the user for the notification, but rather as an implicit subscription based on the user's expert status.

Figure 5:
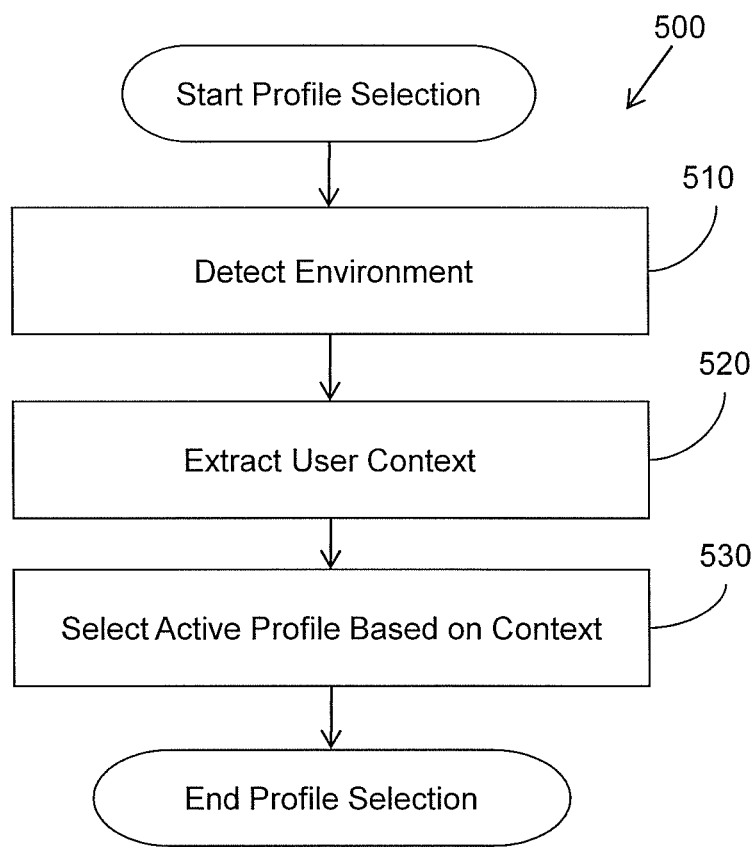
FIG. 5 illustrates another embodiment of a method associated with event processing.

FIG. 5 illustrates one embodiment of a method 500 associated with setting an active profile based on a user's context. At 510 the method includes detecting an environment associated with a user. At 520, the environment is analyzed to extract context information about the user. At 530, the method includes selecting an active profile for the user based on the context information. For example, in the preference table 110 shown in FIG. 1, there is an entry for a "quiet" profile in which notifications pertaining to the Arc Suppressor product are blocked. This profile may be selected according to a company policy that blocks internal notifications just prior to an SEC report about the Arc Suppressor product.

Figure 6:
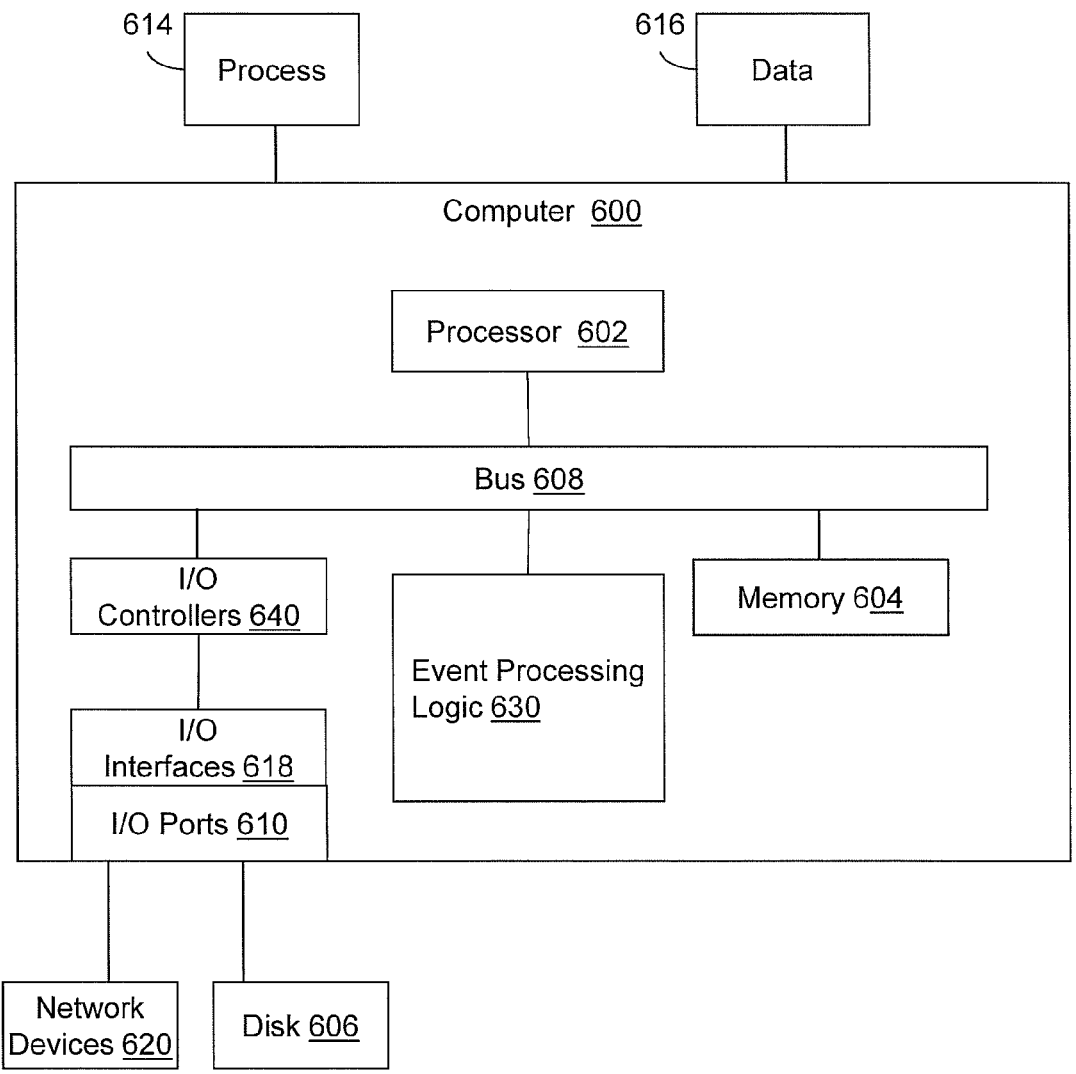
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include an event processing logic 630 configured to facilitate event processing. In different examples, the event processing logic 630 may be implemented in hardware, a non-transitory computer-readable medium with stored instructions, firmware, and/or combinations thereof. While the event processing logic 630 is illustrated as a hardware component attached to the bus 608, it is to be appreciated that in one example, the logic 630 could be implemented in the processor 602.

In one embodiment, event processing logic 630 is a means (e.g., hardware, non-transitory computer-readable medium, firmware) for event processing.

The means may be implemented, for example, as an ASIC programmed to process events based on user preferences extracted from user related events. The means may also be implemented as stored computer executable instructions that are presented to computer 600 as data 616 that are temporarily stored in memory 604 and then executed by processor 602.

Event processing logic 630 may also provide means (e.g., hardware, non-transitory computer-readable medium that stores executable instructions, firmware) for event processing. In one embodiment, the instructions include detecting an event associated with a user, identifying an artifact associated with the event, analyzing the artifact to extract information related to one or more user preferences, extracting one or more user preferences based on the extracted information, and storing the one or more extracted user preferences for future processing.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the various methods described herein, for example, with respect to FIGS. 1-5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these. For example, a user may refer to a singular person, groups of persons, an organization, an enterprise, and so on.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the non-transitory computer-readable medium comprising:
   instructions for determining
      a present context of the user that describes one or more of: a present time, a present date, a work/vacation status, or a geographic location of the user;
   instructions for selecting an active profile for the user from a plurality of profiles based, at least in part, on the present context of the user, where a profile specifies content management actions to be performed in response to events associated with the user, where the profile specifies different content management actions with respect to different topics; and
   instructions for:
      detecting a first event that includes an operation on a first artifact;
      extracting a first topic of the first artifact;
      determining a first content management action associated with the first topic in the active user profile;
      performing the first content management action;
      detecting a second event that includes an operation on a second artifact;
      extracting a second topic of the second artifact, where the second topic is different than the first topic;
      determining a second content management action associated with the second topic in the active user profile, where the second content management action is different than the first content management action; and
      performing the second content management action.

2. The non-transitory computer-readable medium of claim 1, further comprising instructions for updating the preferences of the user based on the extracted information, where the preferences of the user specify the desired content management actions in response to future events.

3. The non-transitory computer-readable medium of claim 2, further comprising instructions for analyzing the first artifact associated with the first event to determine the one or more topics of the artifact and instructions for updating the preferences of the user to indicate that the user has an association with the first topic.

4. The non-transitory computer-readable medium of claim 3, further comprising instructions for subscribing the user to notifications about events related to the first topic.

5. The non-transitory computer-readable medium of claim 2, further comprising instructions for updating the preferences of the user to indicate that the user has expertise with the first topic.

6. The non-transitory computer-readable medium of claim 5, further comprising instructions for receiving an event having a given topic, the event being identified by an enterprise policy as requiring notification to an expert, and providing notification of the event to one or more users having expertise with the given topic.

7. The non-transitory computer-readable medium of claim 1, further comprising instructions for processing notification subscriptions for the user based on the active profile.

8. The non-transitory computer-readable medium of claim 1, further comprising instructions for subscribing the user to notifications about events related to the first topics by creating a subscription rule that is evaluated by a rule engine.

9. The non-transitory computer-readable medium of claim 1, further comprising instructions for analyzing the event to extract information about the user by performing natural language processing on the artifact associated with the event to extract noun phrases from the artifact and to normalize the noun phrases into topics.

10. The non-transitory computer-readable medium of claim 1 wherein:
the first content management action comprises pushing a task assignment for the first event to the user; and
the second content management action comprises notifying the user of the second event.

11. A computing system, comprising:
an event processing system that performs activities to process events; the event processing system being configured to detect events associated with a user, where an event is an occurrence of an operation being performed on an artifact; and
an event processing logic configured to determine
a present context of the user including one or more of: a present time, a present date, a work/vacation status, or a geographic location of the user;
a profile selection logic configured to select an active profile for the user from a plurality of profiles based, at least in part, on the present context of the user; where a profile specifies content management actions to be performed in response to events associated with the user, where each profile specifies different content management actions with respect to different topics;
a memory configured to store the plurality of profiles; and
where the event processing logic is configured to:
detect a first event that includes an operation on a first artifact;
extract a first topic of the first artifact;
determine a first content management action associated with the first topic in the active user profile;
perform the first content management action;
detect a second event that includes an operation on a second artifact;
extract a second topic of the second artifact, where the second topic is different than the first topic;
determine a second content management action associated with the second topic in the active user profile, where the second content management action is different than the first content management action; and
perform the second content management action.

12. The computing system of claim 11, where the event processing logic comprises:
a preference extraction logic configured to extract information from the event about the preferences of the user, where preferences specify the desired content management actions in response to future events; and
a preference logic configured to update the user's preferences based on the extracted information.

13. The computing system of claim 12, where the preference logic is further configured to update the preferences of the user to indicate that the user has an association with the first topic.

14. The computing system of claim 13, further comprising a subscription logic configured to subscribe the user to notifications about events related to the first topic.

15. The computing system of claim 11 wherein:
the first content management action comprises pushing a task assignment for the first event to the user; and
the second content management action comprises notifying the user of the second event.

16. A computer implemented method, the method comprising:
detecting a first event associated with a user;
identifying a first artifact associated with the first event;
analyzing the first artifact to extract
a present context of the user that describes one or more of: a present time, a present date, a work/vacation status, or a geographic location of the user;
selecting an active profile for the user from a plurality of profiles based, at least in part, on the present context of the user, where a profile specifies a content management actions to be performed in response to events associated with the user, where each profile specifies different content management actions with respect to different topics; and
detecting a first event that includes an operation on a first artifact;
extracting a first topic of the first artifact;
determining a first content management action associated with the first topic in the active user profile;
performing the first content management action;
detecting a second event that includes an operation on a second artifact;
extracting a second topic of the second artifact, where the second topic is different than the first topic;
determining a second content management action associated with the second topic in the active user profile, where the second content management action is different than the first content management action; and
performing the second content management action.

17. The method of claim 16, further comprising:
subscribing the user to notifications about events related to the first topic.

18. The method of claim 16, further comprising analyzing the artifact to extract information about the user by performing natural language processing on the first and second artifacts to extract noun phrases from the artifact and to normalize the noun phrases into topics.

19. The method of claim 16, further comprising:
receiving an event that has been identified as requiring notification of at least one expert;
identifying a user that has been designated as an expert; and
providing notification of the event to the identified user.

20. The computer implemented method of claim 16 wherein:
the first content management action comprises pushing a task assignment for the first event to the user; and
the second content management action comprises notifying the user of the second event.

* * * * *